US008909149B2

(12) United States Patent
Briden et al.

(10) Patent No.: US 8,909,149 B2
(45) Date of Patent: Dec. 9, 2014

(54) MEDIA MODULE OF A DEVICE

(75) Inventors: John J Briden, San Francisco, CA (US); John William Pennington, Jr., Mountain View, CA (US); Kenneth Chan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 13/218,787

(22) Filed: Aug. 26, 2011

(65) Prior Publication Data
US 2013/0052963 A1 Feb. 28, 2013

(51) Int. Cl.
H04B 7/00 (2006.01)
H04B 5/00 (2006.01)
H04W 4/00 (2009.01)
H04M 1/725 (2006.01)

(52) U.S. Cl.
CPC ............. *H04B 5/0081* (2013.01); *H04W 4/008* (2013.01); *H04M 1/7253* (2013.01); *H04B 5/0031* (2013.01); *H04B 5/0037* (2013.01)
USPC ......................................... 455/41.2; 455/420

(58) Field of Classification Search
CPC .. H04W 4/008; H04M 1/7253; H04B 5/0031; H04B 5/0037; H04B 5/0081
USPC ........... 455/41.2, 41.3, 418, 420, 522, 68–70, 455/115.3, 127.1, 135, 296, 343.1–343.6, 455/117, 230, 298, 572, 574, 327
See application file for complete search history.

(56) References Cited

U.S. PATENT DOCUMENTS

| | | | |
|---|---|---|---|
| 7,386,324 B2 | 6/2008 | Moriyama et al. | |
| 7,518,337 B2* | 4/2009 | Beart et al. | 320/108 |
| 7,696,953 B2 | 4/2010 | Matthews et al. | |
| 7,715,834 B2* | 5/2010 | Hibino | 455/420 |
| 8,457,589 B2* | 6/2013 | McQuaide, Jr. | 455/404.1 |
| 8,660,495 B2* | 2/2014 | Liu | 455/41.3 |
| 2006/0068834 A1* | 3/2006 | Jones | 455/550.1 |
| 2006/0076922 A1* | 4/2006 | Cheng et al. | 320/108 |
| 2009/0079386 A1* | 3/2009 | Gallagher et al. | 320/108 |
| 2009/0096414 A1* | 4/2009 | Cheng et al. | 320/108 |
| 2009/0096415 A1* | 4/2009 | Beart et al. | 320/108 |
| 2009/0102744 A1* | 4/2009 | Ram | 345/1.1 |
| 2009/0189565 A1* | 7/2009 | Cheng et al. | 320/108 |
| 2010/0103702 A1* | 4/2010 | Baarman | 363/16 |
| 2010/0233961 A1* | 9/2010 | Holden et al. | 455/41.3 |
| 2010/0234051 A1* | 9/2010 | Holden et al. | 455/466 |
| 2011/0043327 A1* | 2/2011 | Baarman et al. | 340/5.8 |
| 2011/0185048 A1* | 7/2011 | Yew et al. | 709/221 |
| 2011/0210619 A1* | 9/2011 | Beart et al. | 307/104 |
| 2011/0226470 A1* | 9/2011 | Latrille et al. | 166/250.01 |
| 2011/0248665 A1* | 10/2011 | Smith et al. | 320/101 |
| 2011/0282415 A1* | 11/2011 | Eckhoff et al. | 607/61 |

(Continued)

FOREIGN PATENT DOCUMENTS

GB 2418270 3/2006

*Primary Examiner* — Dominic E Rego
(74) *Attorney, Agent, or Firm* — Hewlett-Packard Patent Department; Chun-Liang Kuo

(57) ABSTRACT

A media module of a device including a display component, an audio component, a sensor, a communication component to wirelessly couple the media module with the device to receive audio/video data from the device and to transmit input data to the device, and a power component to inductively receive power from the device if the media module is within proximity of the device.

20 Claims, 6 Drawing Sheets

(56) References Cited

U.S. PATENT DOCUMENTS

| | | |
|---|---|---|
| 2011/0291491 A1* | 12/2011 | Lemmens et al. ............ 307/104 |
| 2011/0304216 A1* | 12/2011 | Baarman ...................... 307/104 |
| 2012/0106104 A1* | 5/2012 | Rak et al. ..................... 361/752 |
| 2012/0120256 A1* | 5/2012 | Hwang et al. ............. 348/207.1 |
| 2012/0150670 A1* | 6/2012 | Taylor et al. ................... 705/16 |
| 2012/0162073 A1* | 6/2012 | Kryze et al. .................. 345/158 |
| 2012/0173890 A1* | 7/2012 | Root et al. .................... 713/300 |
| 2012/0181876 A1* | 7/2012 | Baarman et al. .............. 307/104 |
| 2012/0190403 A1* | 7/2012 | Myers et al. ................ 455/556.1 |
| 2012/0268103 A1* | 10/2012 | Henson et al. ............. 324/76.11 |
| 2012/0284028 A1* | 11/2012 | Chang et al. .................. 704/260 |
| 2013/0012133 A1* | 1/2013 | Liu ............................. 455/41.3 |
| 2013/0128238 A1* | 5/2013 | Estevez et al. .................. 353/79 |

\* cited by examiner

MEDIA MODULE OF A DEVICE

BACKGROUND

If a user would like to use a computing device at another location, the user can move the entire computing device from one location to another. This may include the user moving multiple components of the computing device from one location to another. Additionally, this can lead to frustration as the user makes multiple trips back and forth and may lead to accidental drops which can damage the computing device or injure the user. Alternatively, the user can use a first computing device to remotely connect to a second computing device. This can lead to increased costs as the user operates and maintains the software and hardware components of two independent computing devices.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A media module is a hardware module of the device which can physically separate from the device. The media module can include a communication component for the media module to wirelessly communicate and be controlled by the device when the media module is physically separated from the device and when the media module is physically coupled to the device. When communicating and being controlled by the device, the media module can wirelessly receive audio/video data from the device and wirelessly transmit input data to the device from a sensor of the media module.

The audio/video data can be outputted on a display component and an audio output component of the media module. As a result, the media module can operate as a portable input/output module of the device while a user repositions from one location to another. The media module can also include a power component to inductively receive power from the device if the media module is within proximity of the device. The media module can store power for the media module to wirelessly communicate and wirelessly be controlled by the device if the media module is not within proximity of the device.

Figure 1:
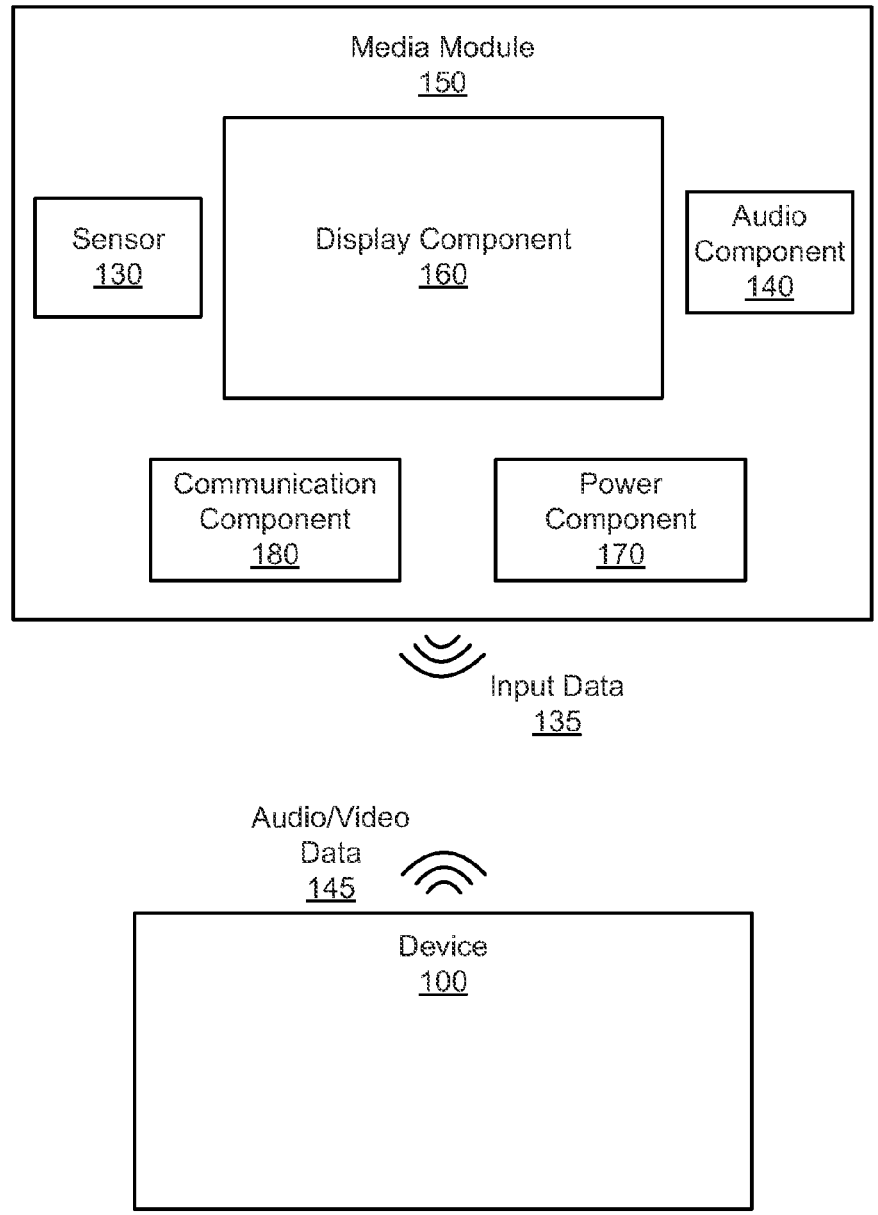
FIG. 1 illustrates a media module of a device according to an example.

FIG. 1 illustrates a media module 150 of a device 100 according to an example. For the purposes of this application, the media module 150 is a portable hardware module of the device 100 which can physically separate from the device 100 and is wirelessly controlled by the device 100. In one embodiment, the media module 150 operates as a wireless input/output portion of the device 100. The media module 150 includes a display component 160, an audio component 140, a sensor 130, a power component 170, and a communication component 180 to wirelessly communicate with the device 100. The device 100 is a computing device with components to wirelessly control and communicate with the media module 150 by sending audio/video data 145 to the media module 150 and by receiving input data 135 from the media module 150. The device 100 can inductively supply power to a power component 170 of the media module 150 if the media module 150 is within proximity of the device 100.

The device 100 can include a controller to control components of the media module 150, a graphics controller to generate video data for the media module 150, an audio controller to generate audio data for the media module 150, a second communication component for the device 100 to wirelessly control and communicate with components of the media module 150, and a power source to supply power to the media module 150 if the media module 150 is within proximity of the device 100. In other embodiments, the device 100 can include additional components, such as a storage component, a memory component, and a media application. The media application can be a firmware, an operating system, and/or application which can be executed by the controller 120 from a non-transitory computer readable memory of the device 100 to be used independently and/or in conjunction with the controller to control and communicate with the media module 150.

In one embodiment, when physically coupled, the media module 150 and the device 100 can have a form factor of a laptop, a notebook, a netbook, an all-in-one system (AIO), a desktop with a display device, and/or a server with a display device. When physically decoupled, the media module 150 can have a form factor of a display portion of the laptop, the notebook, the netbook, the AIO, the desktop, and/or the server. Additionally, the device 100 can have a form factor of a base of the laptop, the notebook, the netbook, the AIO, the desktop, and/or the server.

In another embodiment, when physically coupled, the media module 150 and the device 100 can have a form factor of cellular device, a PDA (Personal Digital Assistant), a tablet, and/or an E (Electronic)-Reader. When physically decoupled, the media module 150 can have a form factor of a display portion of the cellular device, the PDA, the tablet, and/or the E-Reader. Additionally, the device 100 can have a form factor of a base, bottom portion, and/or an outline of the cellular device, the PDA, the tablet, and/or the E-Reader.

When the media module 150 is wirelessly communicating with the device 100, a communication component 180 of the media module 150 can wirelessly receive audio/video data 145 from the device 100 and wirelessly transmit input data 135 from the media module 150 to the device 100. In one embodiment, wirelessly communicating with the device 100 includes the communication component 180 securely coupling with the second communication component of the device 100 over a single wireless communication channel. The communication component 180 is a hardware component of the media module 150 which wirelessly receives and transmits data and/or instructions between the media module 150 and the device 100. In one embodiment, the communication component 180 is a wireless high definition multimedia interface (HDMI) component.

In response to the communication component 180 receiving audio/video data 145 from the device 100, the media module 150 can output the audio/video data 145 with a display component 160 and an audio component 140. The display component 160 is an output device which uses the video data to display a user interface for a user of the device 100 to interact with. The audio component 140 is an audio output device which outputs sound with audio data.

The media module 150 can also transmit input data 135 to the device 200. A sensor 130 of the media module 150 can detect for a user interacting with the user interface rendered on the display component 160. The sensor 130 is a hardware component which can detect a hand gesture from the user, a touch from the user, and/or a location of the user's touch or hand gesture as the user is interacting with the media module 150. In one embodiment, the sensor 130 can include a touch sensitive screen, a touch sensitive pad, and/or an image capture device coupled to the display component 160.

As noted above, if the media module 150 is within proximity of the device 100, the device 100 can inductively supply power to the power component 170 of the media module 150. For the purposes of this application, the power component 170 is a hardware component of the media module 150 which can receive power from the device 100 or another power source to supply power to components of the media module 150. In one embodiment, the power component 170 includes a battery to store power received from the power source of the device 100 or another power source. As a result, if the media module 150 is physically separated and not within proximity of the device 100, the battery can be used by the power component 170 to supply power to components of the media module 150.

Figure 2:
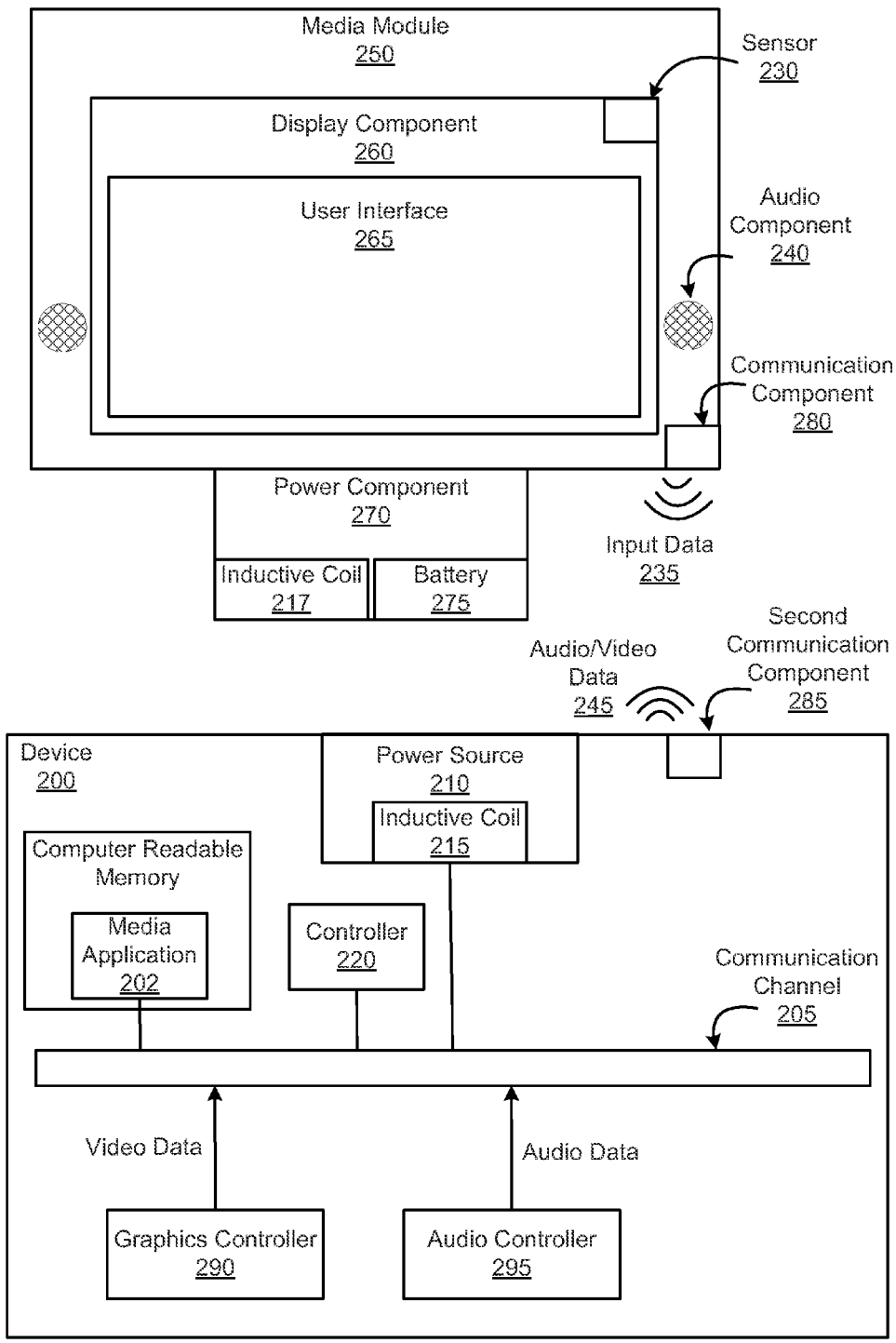
FIG. 2 illustrates components of a device and components of a media module according to an example.

FIG. 2 illustrates components of a device 200 and components of a media module 250 according to an example. The device 200 is a computing device which includes components to wirelessly control and communicate with the media module 250. As shown in FIG. 2, the device 200 can include a controller 220, a graphics controller 290, an audio controller 295, a power source 210, a second communication component 285, a media application 205, and a communication channel 205 for one or more components of the device 200 to communicate with one another. In other embodiments, the device 200 additionally includes a memory component (random access memory) and a storage component to be used by the components of the device 200 and the components of the media module 250.

When controlling and communicating with components of the device 200, the controller 220 and/or the media application 202 use the communication bus 205 to send and receive data and/or instruction from components of the device 200. When controlling and communicating with components of the media module 250, the controller 220 and/or the media application 202 instruct the second communication component 285 to send and receive data and/or instructions from components of the media module 250.

The second communication component 285 is a hardware communication component which wirelessly couples with the communication component 280 of the media module 250 for the controller 220 and/or the media application 202 to wirelessly control and communicate with the media module 250. In one embodiment, the second communication component 285 includes a wireless high definition multimedia interface component. In another embodiment, the second component 285 can be a Bluetooth component, an infrared component, a wireless radio component, and/or any additional component which can wirelessly receive and transmit instructions and/or data between the device 200 and the media module 250.

The controller 220 and/or the media application 202 instruct the second communication component 285 and/or the communication component 280 to utilize a single wireless communication channel to transfer instructions and/or data between the device 200 and the media module 250. In one embodiment, the controller 220 and/or the media application 202 select a wireless radio frequency to be used as the wireless communication channel. Additionally, the wireless communication channel can use one or more wireless communication protocols, such as a Bluetooth protocol, an Infrared protocol, and/or a wireless local area network protocol.

The data and/or instructions can be communicated between the communication component 280 and the second communication component 285 as raw data. In another embodiment, the communication component 280 and the second communication component 285 encrypt the single wireless communication channel with an encryption algorithm, a password, and/or a software or hardware token when transmitting data and/or instructions between the device 200 and the media module 250. As the data and/or instructions is received from the transmitting communication component, the single communication channel is decrypted by the receiving communication component to access the data and/or instructions.

The data can include audio/video data 245 generated by the device 200. For the purposes of this application, the audio/video data 245 can include one or more images, videos, and/or audio to be outputted by the media module 250. In one embodiment, the audio/video data 245 can also include video settings, audio settings, and/or timing information to be used when outputting the audio/video data 245. The video data can be generated by a graphics controller 290 of the device 200 and the audio data can be generated by an audio controller 295 of the device 200. In another embodiment, the device 200 can include a media controller to generate both the video data and the audio data. As the audio/video data is generated, the second communication component 285 can transmit the audio/video data 245 to the communication component 280 of the media module 250.

As illustrated in FIG. 2, the media module 250 is a hardware module of the device 200 which can wirelessly communicate and is wirelessly controlled by the device 200 when the media module 250 is physically coupled to the device 200 and when the media module 250 is physically decoupled from the device 200. The media module 250 can include a display component 260, an audio component 240, a sensor 230, a communication component 280, and a power component 270. In other embodiments, the media module 250 includes additional components, such as a webcam, a microphone, and/or a storage component.

The display component 260 is an output device which displays and/or renders a user interface 265 with the video data 245 generated by the device 200. The user interface 265 can include alphanumeric text, icons, menus, images and/or videos for the user to view and interact with. In one embodiment, the display component 260 is an output device, such as a LCD (liquid crystal display), a LED (light emitting diode) display, a CRT (cathode ray tube) display, a plasma display, a projector and/or any additional device configured to display the user interface 265. The audio component 240 is an output device which can output sound with the audio data 245 from the device 200. In one embodiment, the audio component 240 is an audio speaker of the media module 250.

As the audio/video data 245 is outputted by the media module 250, a sensor 230 of media module 250 can detect for a user interacting with the media module 250. The sensor 230 is a hardware component of the media module 250 which can detect information of the user touching and/or making one or more hand gestures. Additionally, the sensor 230 can be coupled to the display component 260. In one embodiment, the sensor 230 is a touch sensitive screen, a touch sensitive pad, an image capture device, and/or any additional component which can detect the user interacting with the media module 250.

The sensor 230 can supply the detected information to the communication component 280 as input data 235. The input data 235 can include information of whether a touch was detected, whether a hand gesture was detected, and/or a location of the touch or hand gesture. Additionally, the input data 235 can include information of the hand gesture, such as a direction of the hand gesture, a number of hands used in the hand gesture, and/or a number of fingers used in the hand gesture. The input data 235 can then be transmitted by the communication component 280 to the device 200.

The communication component 280 is a hardware communication component which wirelessly couples with the second communication component 288 of the device 200 for the controller 220 and/or the media application 202 to wirelessly control and communicate with the media module 250. In one embodiment, the communication component 280 includes a wireless high definition multimedia interface component. In another embodiment, the component 280 can be a Bluetooth component, an infrared component, a wireless radio component, and/or any additional component which can wirelessly receive and transmit instructions and/or data.

As illustrated in FIG. 2, the device 200 includes a power source 210. The power source 210 is a hardware component of the device 200 configured to inductively supply power to a power component 270 of the media module 250. For the purposes of this application, the power component 270 is a hardware component of the media module 250 which supplies power to components of the media module 250. As shown in FIG. 2, the power source 210 includes an inductive coil 215 to inductively couple with the power component 270 of the media module 250 to create an electromagnetic field between the power component 270 and the power source 210 if the media module 250 is within proximity of the device 200. In one embodiment, the power component 270 includes a second inductive coil 217 to inductively couple with the inductive coil 215 of the power source 210. As a result, if the media module 250 is within proximity of the device 200, the media module 250 can be powered by the power source 210 of the device 200. Additionally, as illustrated in FIG. 2, the power component 270 can include a battery 275. The battery 275 is a power storage component which can receive and store power received by the power source 210 or another power source coupled to the power component 270. As a result, the battery 275 can be used by the power component 270 as a power source if the media module 250 is not within proximity of the device 200.

Figure 3A:
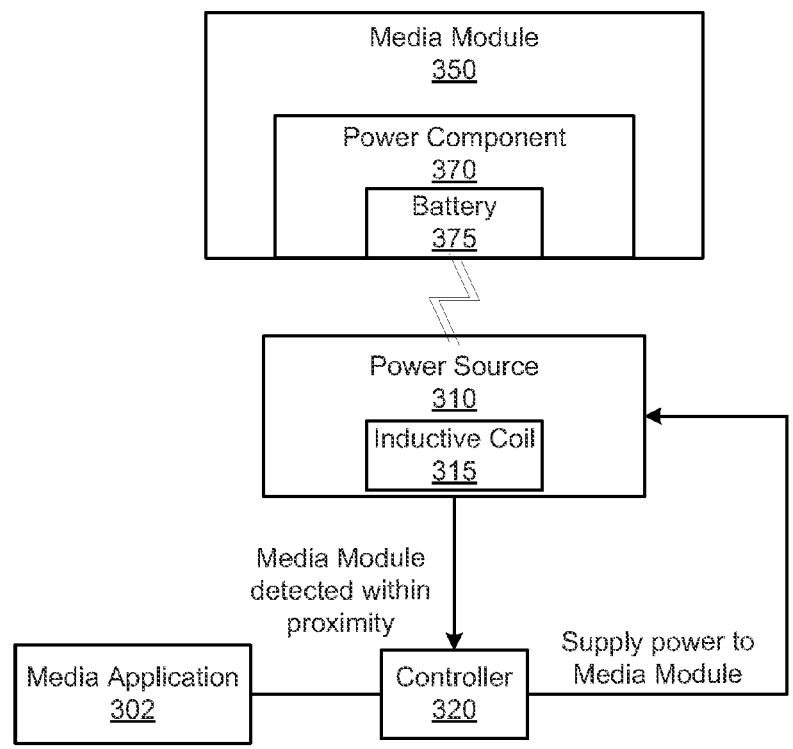
FIG. 3A and FIG. 3B illustrate a power component supplying power for a media module according to examples.
Figure 3A:
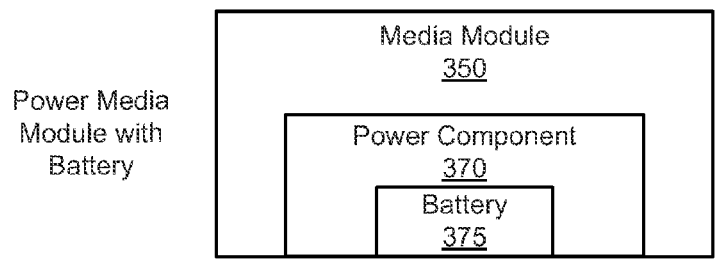
Figure 3B:
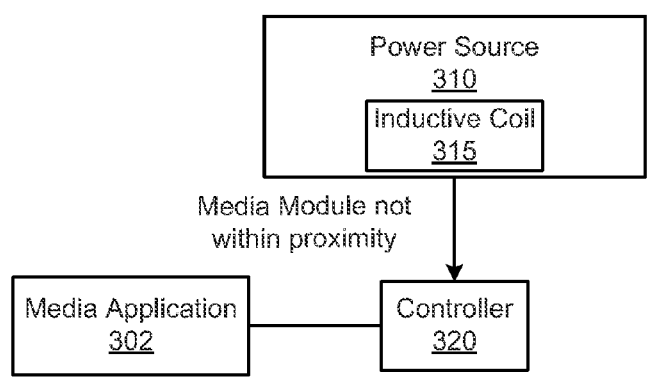

FIG. 3A and FIG. 3B illustrate a power component supplying power for a media module according to examples. As illustrated in FIG. 3A, a controller 320 and/or media application 302 of the device can determine whether the media module 350 is within proximity of the device. The inductive coil 315 of the power source 310 can detect whether a second inductive coil of the power component 370 is within proximity of the inductive coil 315. If the second inductive coil is detected by the inductive coil 315, the inductive coil 315 can notify the controller 320 and/or the media application 302 that the media module is detected within proximity of the device. In response, the controller 320 and/or the media application 302 can instruct the power source 310 to supply power to the power component 370 of the media module 350.

As noted above, the power source 310 can inductively supply power to the power component 370 of the media module 350 through the inductive coil 315. An electromagnetic field is created between the inductive coil 315 and the second inductive coil if the two inductive coils are within proximity of one another. In one embodiment, the two inductive coils are within proximity of one another if the media module 350 is physically touching the device. The power source 310 can supply power to the power component 370 as an alternating current or as a direct current through the electromagnetic field. In response to receiving power from the power source 310, the received power can be used by the power component 370 to power components of the media module 350. Additionally, a battery 375 coupled to the power component 370 can store power received from the power source 310 for future use.

In another embodiment, as illustrated in FIG. 3B, if the media module 350 is physically separated from the device such that the media module 350 is not within proximity of the device, the power component 370 detects that power is no longer being received from the power source 310. In response, the power component 370 uses the battery 375 to power the components of the media module 350 so that the media module 350 can continue to operate to communicate and be controlled by the device. In one embodiment, the inductive coil 315 additionally notifies the controller 320 and/or the media application 302 that the media module 350 is not within proximity.

Figure 4:
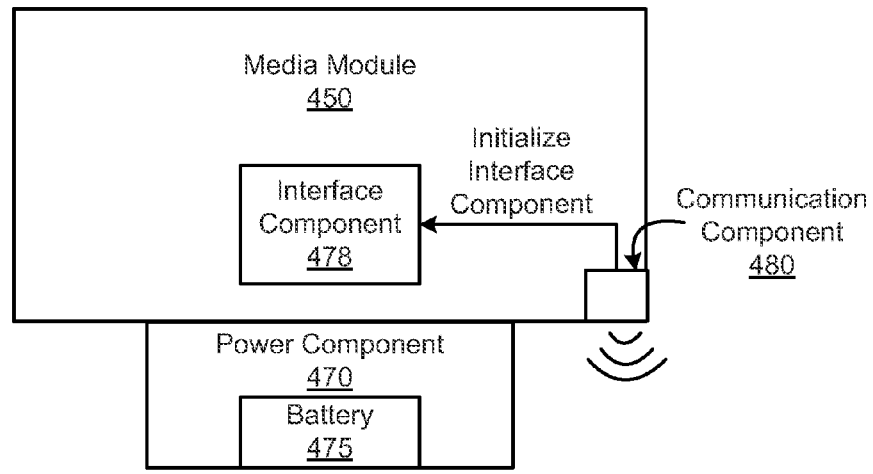
FIG. 4 illustrates a device communicating with a media module according to an example.
Figure 4:
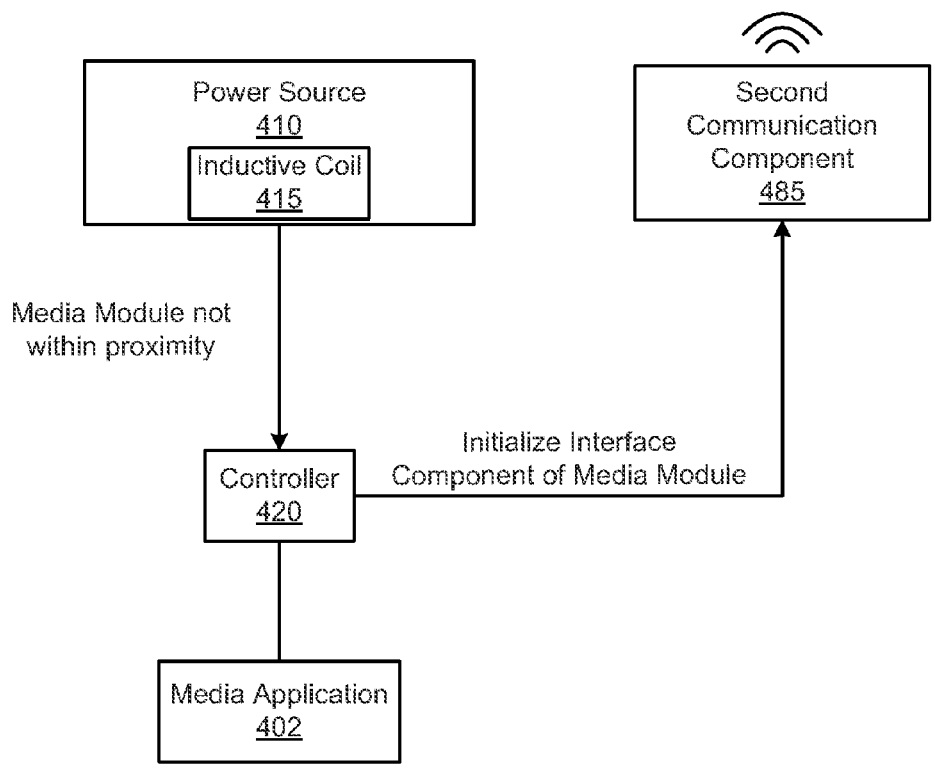

FIG. 4 illustrates a device communicating with a media module 450 according to an example. As shown in FIG. 4, the inductive coil 415 of the power source 415 has not detected a second inductive coil of the power component 470. In response, the inductive coil 415 notifies the controller 420 and/or the media application 402 that the second inductive coil is not detected and the controller 420 determines that the media module 450 is not within proximity of the device. The controller 420 and/or the media application 402 then instructs the second communication component 485 to transmit an instruction for the media module 450 to initialize an interface component 478 of the media module 450. In one embodiment, the controller 420 and/or the media application 402 further instructs the power source 410 to stop supplying power through the inductive coil 415.

As noted above, if the media module 450 is not within proximity of the device, the power component 470 can use the battery 475 to power components of the media module 450. As a result, the communication component 480 can continue to receive and transmit instructions and data between the media module 450 and the device. As shown in the present embodiment, the communication component 480 has received an instruction from the device for the media module 450 to initialize the interface component 478 of the media module 450.

Figure 5A:
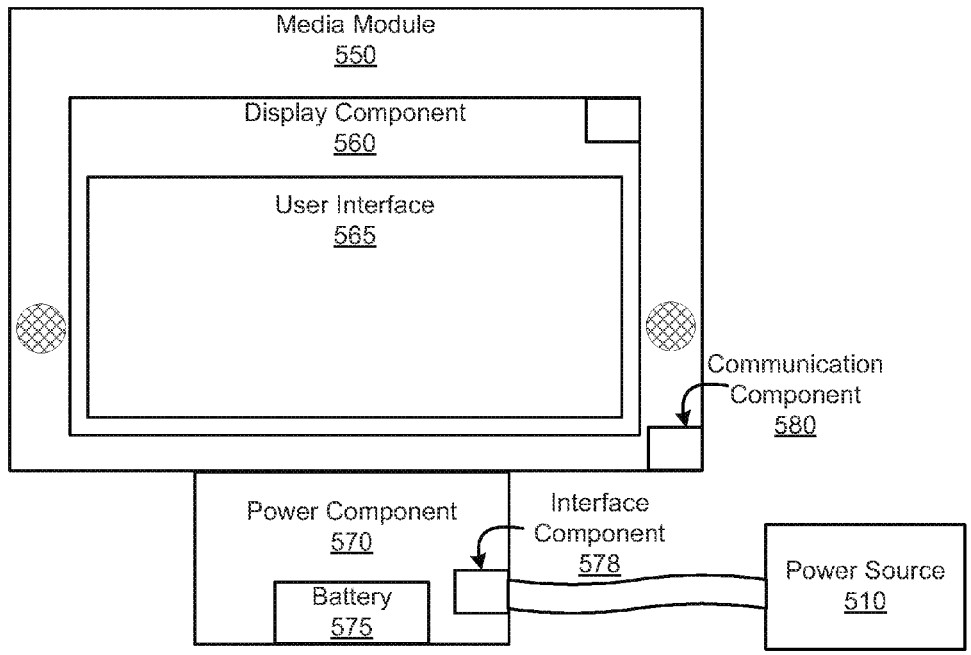
FIG. 5A and FIG. 5B illustrate an interface component receiving power for a media module according to an example.
Figure 5B:
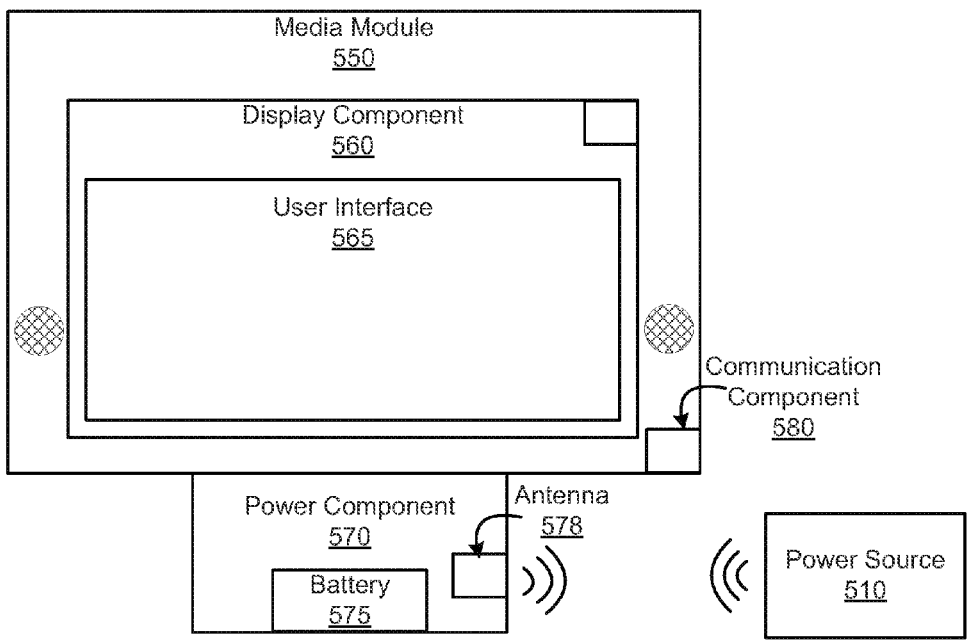

FIG. 5A and FIG. 5B illustrate an interface component 578 receiving power for a media module 550 according to an example. For the purposes of this application, the interface component 578 is a hardware component of the media module 550 which can couple with the power source 510 and/or another power source if the media module 550 is physically separated from the device. In one embodiment, the interface component 578 is integrated as part of the power component 570. In another embodiment, the interface component 578 is coupled to a rear panel, a bottom panel, and/or a side panel of the media module 550. As shown in FIG. 5A, the interface component 578 can include a physical port to physically couple the power component 550 to the power source 510 or another power source with a cable. In one embodiment, the physical port can include a universal serial bus port, a high definition multimedia interface port, a power cable, and/or any additional cable to transfer power from a power source to the power component 570.

In another embodiment, as shown in FIG. 5B, the interface component can be an antenna 578. The antenna 578 is a hardware component of the media module 550 which can wirelessly receive power from the power source 510 or another power source. In one embodiment, the antenna 578 is a circular polarized antenna and the antenna 578 receives the power from the power source 510 as circular polarized waves. As the power component 570 receives power from the interface component 578, the power can be supplied to the components of the media module 550. Additionally, the power component 570 can store any excess power within the battery 575.

Figure 6:
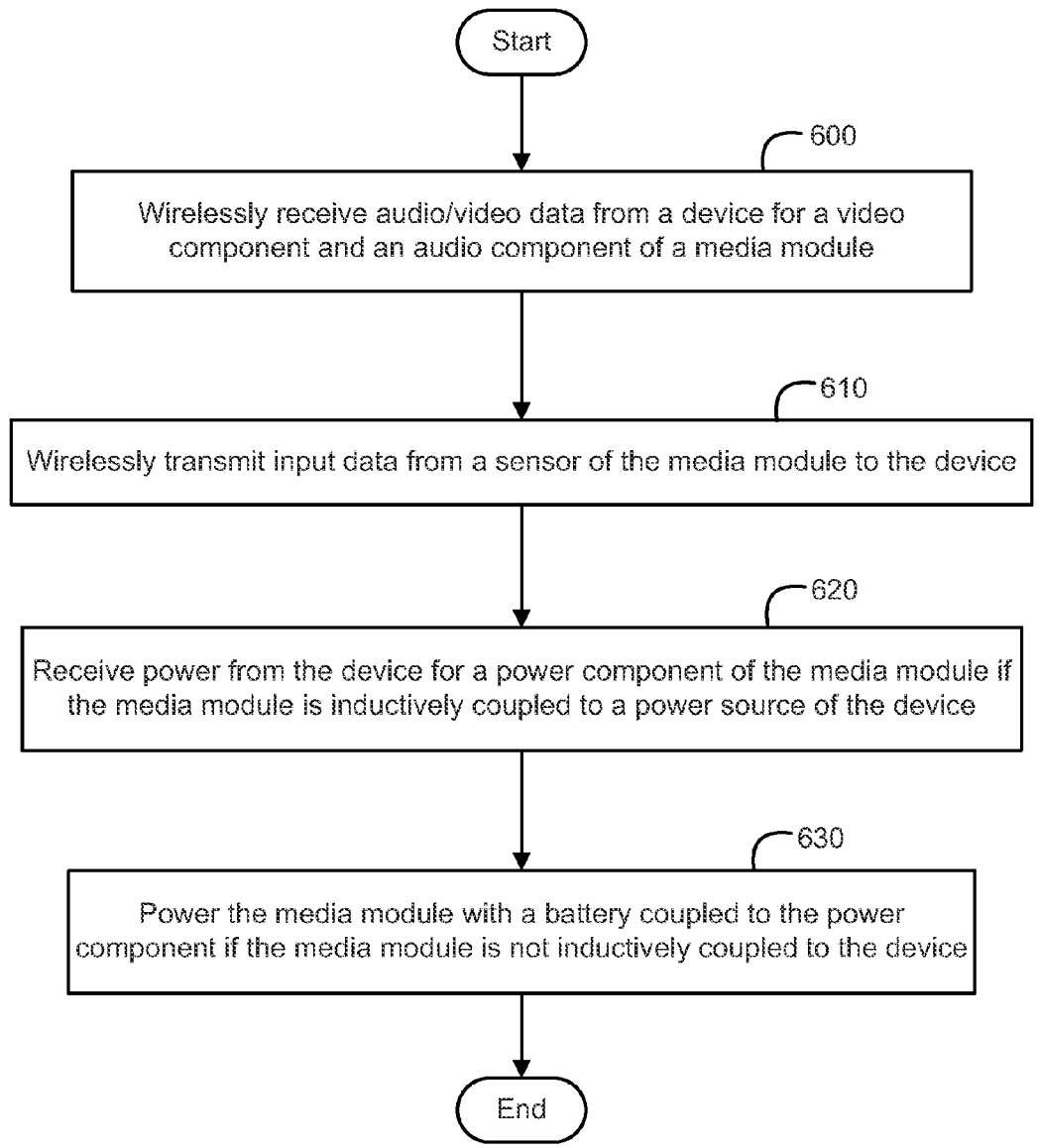
FIG. 6 is a flow chart illustrating a method for managing a media module according to an example.

FIG. 6 is a flow chart illustrating a method for managing a media module according to an example. The method of FIG. 6 uses a device with a media module which can wireless be controlled and communicate with the device whether physically coupled or physically decoupled from the device. In one embodiment, the media module operates as an input/output portion of the device. As noted above, the media module includes a display component, an audio component, a sensor, a communication component, and a power component.

Further, the device can include a controller and/or a media application to control components of the device and the media module, a graphics controller to generate video data for the display component, an audio controller to generate audio data for the audio component, a second communication component to communicate data and/or instructions between the device and the media module, and a power source to inductively supply power to the media module if the media module is within proximity of the device. In another embodiment, instead of including both a graphics controller and an audio controller, the device can include a media controller to generate both the video data and the audio data.

As the audio/video data is generated, the second communication component can wirelessly transmit the audio/video data to the communication component of the media module. The communication component can then wirelessly receive the audio/video data from the device for the video component and the audio component of the media module at 600. The display component can then display a user interface for a user to interact with using the video data. Additionally, the audio component can output audio with the audio data.

As the audio/video data is being outputted, the sensor of the media module can detect for a user interacting with the media module. In one embodiment, the sensor can be a touch screen, a touch component, and/or an image capture component. The sensor can detect for a touch, a hand gesture, and/or a location of the touch or hand gesture. The sensor can share information of the user interaction as input data for the communication component to transmit to the second communication component of the device at 610.

In one embodiment, the communication component and/or the second communication component can use a single wireless communication channel to communicate instructions and/or the data. Additionally, both the communication component and the second communication component can encrypt the single wireless communication channel when transmitting the instructions and/or data. In response to receiving any data and/or instructions, the communication component and/or the second communication component can decrypt the single wireless communication channel.

In response to receiving any input data, the controller and/or the media application can determine that an input has been received for the device. Additionally, as noted above, the power component of the media module can receive power from the media module if the media module is within proximity of the device to be inductively charged or powered at 620. The power source of the device can include an inductive coil to inductively supply power to the power component of the media module if the media module is within proximity. In one embodiment, the media module is within proximity of the device if the media module is physically contacting the device.

If the media module is not within proximity of the device to not be inductively powered, the power component can power the media module with a battery of the media module at 630. In one embodiment, as the battery is powering the components of the media module, the controller and/or the media application can issue an instruction through the second communication component for the media module to initialize an interface component of the media module. The interface component is a hardware component of the media module which can receive power from the power source of the device or another power source if the media module is not within proximity of the device to be inductively charged. In one embodiment, the interface component includes a port to physically couple the interface component to a power source and receive power through the cable. In another embodiment, the interface component can include an antenna to wirelessly receive power from a power source. The method is then complete. In other embodiments, the method of FIG. 6 includes additional steps in addition to and/or in lieu of those depicted in FIG. 6.

What is claimed is:

1. A device comprising:
   a base module; and
   a media module comprising:
   a display component to display video data to a user of the device;
   an audio component to output audio data to the user of the device;
   a sensor to detect an input from the user of the device;
   a communication component to wirelessly couple the media module with the base module to receive audio/video data from the base module and to transmit input data to the base module; and
   a power component to inductively receive power from the base module if the media module is within proximity of the base module.

2. The device of claim 1 wherein the communication component is a wireless high definition multimedia interface component.

3. The device of claim 1 wherein the power component includes a battery to power the media module if the media module does not receive an inductive charge from the base module.

4. The device of claim 1 wherein the power component includes an interface component to physically couple the media module to the base module in a detachable manner.

5. The device of claim 1 wherein power component includes an antenna to receive circular polarized waves from the power source of a second power source if the media module does not receive an inductive charge from the base module.

6. The device of claim 1 wherein the base module includes:
   a controller to control components of the media module;
   a graphics controller to supply the video data for the display component of the media module;
   an audio controller to supply the audio data for the audio component of the media module;
   a second communication component to wirelessly transmit the audio/video data to the media module and to wirelessly receive the input data from the media module;
   an inductive coil to detect if the media module is within proximity of the base module; and a power source to inductively supply power to the media module through the inductive coil if the media module is within proximity of the base module.

7. The device of claim 6 wherein the media module is within proximity of the base module when the media module is physically touching the base module.

8. A method comprising:
wirelessly receiving, at a media module of a device, audio/video data from a base module of the device for a video component and an audio component of the media module;
wirelessly transmitting input data from a sensor of the media module to the base module;
receiving power from the base module for a power component of the media module if the media module is inductively coupled to a power source of the base module; and
powering the media module with a battery coupled to the power component if the media module is not inductively coupled to the base module.

9. The method of claim 8 further comprising receiving circular polarized waves with an antenna of the media module if the media module is not inductively coupled to the base module.

10. The method of claim 8 further comprising receiving power from a second power source if the media module is not inductively coupled to the device and an interface component of the media module physically couples the power component to the second power source.

11. The method of claim 8 further comprising communicating the audio/video data and the input data using a single communication channel between the media module and the base module.

12. The method of claim 11 further comprising encrypting the single communication channel utilized by the media module and the base module.

13. The method of claim 12 wherein a communication component of the media module decrypts the single communication channel when receiving the audio/video data from the base module and encrypts the single communication channel when transmitting the input data to the base module.

14. The method of claim 8 further comprising determining whether to power the media module with at least one of a power source of the base module, a battery of the media module, and a second power source.

15. A non-transitory computer readable medium storing instructions that if executed cause a controller to:
wirelessly interface a media module of a device to receive audio/video data from a base module of the device and to transmit input data from the media module to the base module of the device through a communication channel;
output the video data on a display component of the media module and output the audio data on an audio component of the media module;
inductively receive power from the base module for a power component of the media module if the media module is within proximity of the base module; and
power the media module with a battery coupled to the power component if the media module is not within proximity of the base module.

16. The computer readable medium comprising instructions of claim 15 wherein the audio/video data and the input data is communicated between the media module and the base module as uncompressed data.

17. The computer readable medium comprising instructions of claim 15 wherein the sensor is coupled to the display component.

18. The computer readable medium comprising instructions of claim 15 wherein the media module includes an interface component to physically couple the media module to the base module in a detachable manner.

19. The computer readable medium comprising instructions of claim 15 wherein the display component of the media module is to display a graphic user interface of the device.

20. The computer readable medium comprising instructions of claim 15 wherein the input data comprises one or more user commands to control the device.

\* \* \* \* \*